(12) United States Patent
Lu (10) Patent No.: US 11,029,177 B2
(45) Date of Patent: Jun. 8, 2021

(54) PRESSURE COMPENSATED SENSORS

(71) Applicant: General Electric Company, Schenectady, NY (US)

(72) Inventor: Dan Tho Lu, Minden, NV (US)

(73) Assignee: BAKER HUGHES HOLDINGS LLC, Houston, TX (US)

( * ) Notice: Subject to any disclaimer, the term of this patent is extended or adjusted under 35 U.S.C. 154(b) by 494 days.

(21) Appl. No.: 15/598,159

(22) Filed: May 17, 2017

(65) Prior Publication Data
US 2018/0335323 A1    Nov. 22, 2018

(51) Int. Cl.
*G01D 11/24*    (2006.01)
*G01D 11/26*    (2006.01)
(Continued)

(52) U.S. Cl.
CPC .......... *G01D 11/245* (2013.01); *E21B 33/037* (2013.01); *E21B 33/0385* (2013.01);
(Continued)

(58) Field of Classification Search
CPC ...... G01D 11/245; G01D 11/30; G01D 11/26; E21B 33/037; E21B 33/0385; E21B 47/09; E21B 47/011
(Continued)

(56) References Cited

U.S. PATENT DOCUMENTS 3,385,369 A * 5/1968 Saurenman ........... E21B 47/011
138/31

4,073,191 A * 2/1978 Saigusa ................. G01L 9/0072
361/283.3
(Continued)

FOREIGN PATENT DOCUMENTS

| EP | 2 940 246 A1 | 11/2015 |
| EP | 3073497 A1 | 9/2016 |
| EP | 3 091 175 A1 | 11/2016 |

OTHER PUBLICATIONS

Extended European Search Report and Opinion issued in connection with corresponding EP Application No. 18172199.4 dated Sep. 4, 2018.
(Continued)

*Primary Examiner* — Marrit Eyassu
(74) *Attorney, Agent, or Firm* — Mintz Levin Cohn Ferris Glovsky and Popeo, PC; Lisa Adams (57) ABSTRACT

A pressure compensated sensing system and methods for using the same are provided. The system can include a housing, a seal, an incompressible fluid, and sensing elements. The seal can be positioned within a housing cavity and divide the cavity into two portions. A first cavity portion can be sealed from the fluid environment by the seal and contain the sensing elements and the incompressible fluid. A second cavity portion can be in fluid communication with the fluid environment. The fluid environment can apply an external pressure to the seal that is opposed by an internal pressure of the sealed cavity applied to the seal by the incompressible fluid. When the internal pressure and the external pressure are different, the seal can move in a manner that changes the volume of the sealed cavity by an amount sufficient to equalize the internal pressure with the external pressure.

7 Claims, 7 Drawing Sheets

(51) Int. Cl.
    *E21B 33/038*     (2006.01)
    *G01D 11/30*     (2006.01)
    *E21B 47/09*     (2012.01)
    *E21B 33/037*     (2006.01)
    *E21B 47/017*     (2012.01)

(52) U.S. Cl.
    CPC ............ *E21B 47/017* (2020.05); *E21B 47/09* (2013.01); *G01D 11/26* (2013.01); *G01D 11/30* (2013.01)

(58) Field of Classification Search
    USPC .......................................... 73/49.3
    See application file for complete search history.

(56) References Cited

U.S. PATENT DOCUMENTS

| | | | | |
|---|---|---|---|---|
| 4,788,867 | A * | 12/1988 | Kishel | G01L 9/0085 336/30 |
| 5,644,186 | A | 7/1997 | Birchak et al. | |
| 5,796,007 | A * | 8/1998 | Panagotopulos | G01L 9/0089 73/716 |
| 6,439,055 | B1 * | 8/2002 | Maron | G01L 9/06 73/705 |
| 6,483,778 | B1 * | 11/2002 | Pozzo | G10K 11/006 367/172 |
| 9,016,387 | B2 | 4/2015 | Williamson, Jr. et al. | |
| 9,200,496 | B2 | 12/2015 | Reid | |
| 9,658,362 | B2 * | 5/2017 | Hernandez Marti | E21B 47/011 |
| 2007/0284117 | A1 | 12/2007 | Smithson | |
| 2010/0051260 | A1 | 3/2010 | Vick, Jr. et al. | |
| 2010/0147064 | A1 | 6/2010 | DiFoggio | |
| 2011/0101967 | A1 * | 5/2011 | Kayserman | H03K 17/9535 324/207.15 |
| 2013/0167962 | A1 * | 7/2013 | Skjetne | F16L 55/04 138/30 |
| 2013/0199286 | A1 * | 8/2013 | Gao | G01N 9/00 73/152.27 |
| 2015/0300841 | A1 * | 10/2015 | Campbell | G01D 5/20 417/410.1 |
| 2015/0300848 | A1 | 10/2015 | Campbell et al. | |
| 2016/0123830 | A1 * | 5/2016 | Brown | G01L 9/0022 73/702 |
| 2016/0138948 | A1 | 5/2016 | Cordill | |
| 2017/0085071 | A1 | 3/2017 | Burrow et al. | |
| 2018/0017416 | A1 | 1/2018 | Haldorsen | |

OTHER PUBLICATIONS

Extended European Search Report and Opinion issued in connection with corresponding EP Application No. 18172200.0 dated Sep. 17, 2018.

* cited by examiner

PRESSURE COMPENSATED SENSORS

BACKGROUND

Machinery is often deployed in subsea environments for applications such as energy production (e.g., oil and gas). Subsea environments can present complex and unpredictable conditions that can result in machine damage requiring maintenance. Since subsea maintenance generally requires planning and specialized equipment, sensors are commonly installed to evaluate the health of subsea machinery, allowing early warning and preparation to be performed prior to loss of production.

Like subsea machinery, these sensors can be designed to withstand in service pressures (e.g., due to the subsea environment, the machinery, etc.). As an example, sensors can include thick walled housings capable of withstanding anticipated subsea pressures. However, such configurations can decrease the performance of the sensor.

SUMMARY

In general, systems and methods are provided for pressure compensation of sensors, such as proximity sensors.

In one embodiment, a pressure compensated sensor system is provided and can include a housing, a seal, and one or more sensing elements. The housing can define a cavity therein, and the seal can be positioned within the cavity and it can divide the cavity into a first fluidly sealed cavity portion and a second cavity portion configured for exposure to a fluid environment surrounding the housing. The one or more sensing elements can be positioned within the first cavity portion. An incompressible fluid can also be disposed within the first cavity portion. The seal can be configured to move in response to pressure differences between the first cavity and the second cavity.

In one embodiment, the housing can include an aperture in a sidewall configured to allow fluid to flow from the fluid environment into the second cavity portion.

The seal can have a variety of configurations. In one aspect, the seal can be a diaphragm seal configured to elastically deform in response to pressure differences between the first cavity and the second cavity. In another aspect, the seal can be a piston seal configured to translate along a longitudinal axis of the housing in response to pressure differences between the first cavity and the second cavity.

In another embodiment, the incompressible fluid can substantially fill the first cavity portion. The sensing elements can also be submerged within the incompressible fluid filling the first cavity portion. The incompressible fluid can be, for example, a dielectric.

In another embodiment, the sensing elements can include a proximity sensor configured to induce an eddy current in a target.

In another embodiment, the fluid environment can be a subsea environment.

In other aspects, a pressure compensated proximity sensing system is provided and can include a housing, a cap, an inner tube, and a seal. The housing can define a cavity extending along its length. The cap can be secured to a distal end of the housing and can define a cap volume configured to receive at least one proximity sensing element. The inner tube can be positioned within the cavity. The seal can be positioned within the cavity and it can extend between the housing and an outer surface of the inner tube. The cap volume, a distal facing surface of the seal, the housing, and the inner tube can define a first cavity portion that can be hermetically sealed and contain an incompressible fluid therein. A proximal facing surface of the seal, the housing, and an outer surface of at least a portion of the inner tube can define a second cavity portion that can receive a flow of fluid from a fluid environment surrounding the housing. The seal can also be configured to adjust a pressure within the first cavity portion in response to a pressure difference between the first cavity portion and the second cavity portion.

In certain aspects, the housing can include one or more apertures for allowing an environmental fluid to flow into the second cavity portion.

The seal can have a variety of configurations. In one aspect, the seal can be a diaphragm seal interposed between the housing and the inner tube. The diaphragm seal can be configured to elastically deform when a pressure within the first cavity portion is different from a pressure within the second cavity portion. In another aspect, the seal can be a piston seal interposed between the housing and the inner tube. The piston seal can be configured to translate along a longitudinal axis of the housing when a pressure within the first cavity portion is different from a pressure within the second cavity portion.

In another embodiment, the incompressible fluid can substantially fill the first cavity portion. The incompressible fluid can be, for example, a dielectric.

In another embodiment, the sensing system can include at least one proximity sensing element disposed within the cap, and an electrical connector coupled to a proximal end of the housing and having a plurality of wires extending through the inner tube and in electrical communication with the at least one proximity sensing element. The proximity sensing element can be configured to induce an eddy current in a target.

In another embodiment, the fluid environment is a subsea environment.

Methods for equalizing pressure for a sensor within a fluid environment are also provided. In one embodiment, a method can include positioning a sensor within a fluid environment, the sensor having a first cavity containing an incompressible fluid and at least one sensing element, where the incompressible fluid can apply an internal pressure against a first side of a seal. An environmental fluid surrounding the sensor can flow into and can apply an external pressure on a second side of the seal, opposite the first side of the seal. The seal can move from a first position to a second position to thereby adjust the internal pressure in response to a pressure difference between the internal pressure applied to the first side of the seal and the external pressure applied to the second side of the seal.

In one embodiment, the pressure difference can decrease when the seal is moved from the first position to the second position.

In other aspects, the seal can stop moving when the pressure difference is about zero.

In another embodiment, the seal can move from the first position to the second position by elastic displacement. As an example, the seal can be a diaphragm seal.

In another embodiment, the seal can move by translation along a longitudinal axis of the housing. As an example, the seal can be a piston seal.

In other aspects, substantially all void space within the first cavity can be filled with the incompressible fluid.

DESCRIPTION OF DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure.

DETAILED DESCRIPTION

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

Subsea sensing systems, such as proximity sensing systems, are often used to measure health of machinery in subsea environments. As an example, a proximity sensing system can include a sensing element that detects movement of a target machinery component without contact by generating a magnetic field that introduces or induces an eddy current in the target and acquiring return voltage signals that are proportional to a change in distance between the sensing element and the target. Analysis of return signals can provide a measurement of machine health by identifying whether motion of the target machinery component (e.g., distance, displacement, vibration, speed, etc.) is within normal tolerances. In order to operate in subsea environments, subsea sensing systems typically include a housing that protects the sensing element from contact with a subsea environment and from pressure exerted by the subsea environment. However, because the pressure at which the housing is sealed is less than the subsea environment pressure, this housing can be relatively thick to withstand the higher subsea environment pressure. However, the extra housing material can interfere with acquiring return signals. Accordingly, subsea sensors are provided that can seal sensing elements from the subsea environment while also matching the pressure surrounding the sensing elements with the subsea environmental pressure, avoiding the need to thicken the housing to withstand subsea pressures. Other embodiments are within the scope of the disclosed subject matter.

Embodiments of sensing systems are discussed herein with reference to pressure compensated sensors suitable for use in subsea environments. However, embodiments of the disclosure can be employed with any environment without limit.

Figure 1:
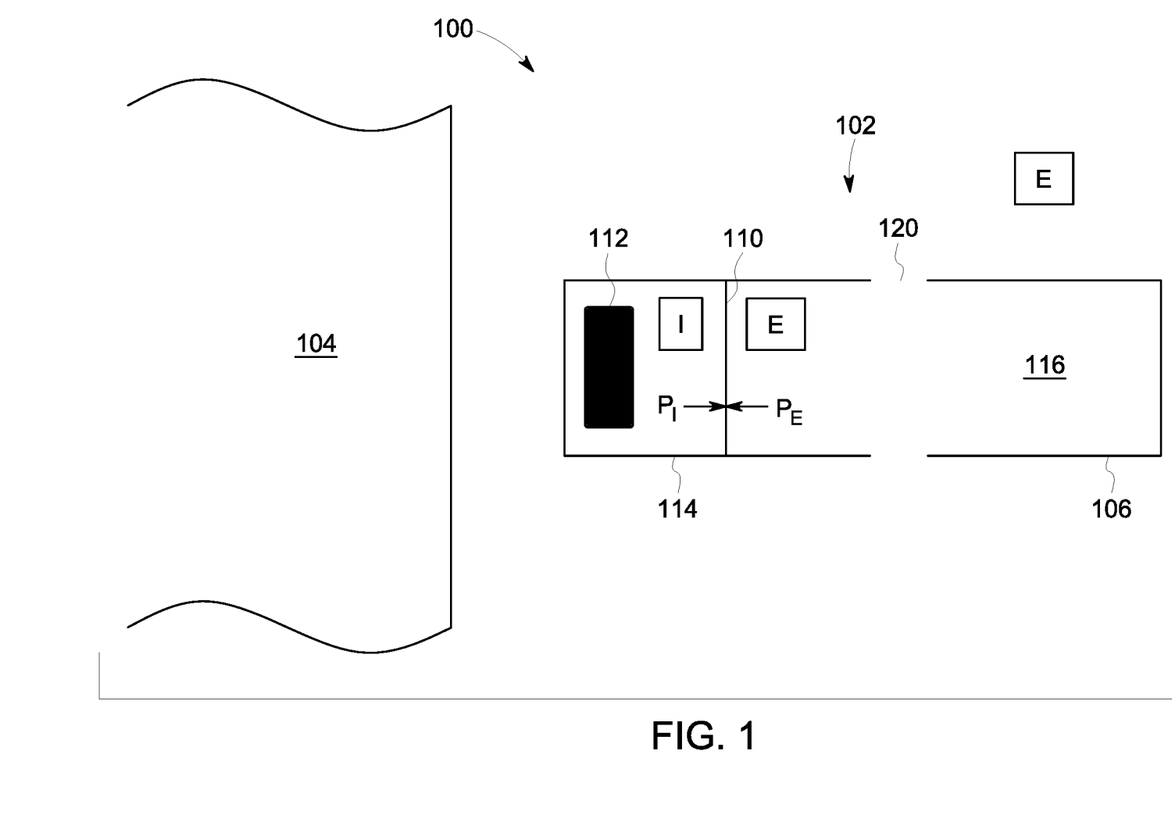
FIG. 1 is a diagram illustrating one exemplary embodiment of an operating environment including a pressure compensated sensor having a housing and a moveable seal positioned within the housing.

FIG. 1 illustrates one exemplary embodiment of an operating environment 100 containing a pressure compensated sensing system 102 and a target 104. In certain aspects, the operating environment 100 can be fluid environment E, such as a subsea environment. As discussed in detail below, the pressure compensated sensing system 102 can include a housing 106, such as a tubular housing, a seal 110, an incompressible fluid I, and sensing elements 112. The seal 110 can be positioned within the housing 106 such that it divides the housing 106 into two cavity portions. A first cavity portion, also referred to as a sealed cavity 114, can be sealed from the fluid environment E by the seal 110 and it can contain the sensing elements 112 and the incompressible fluid I. A second cavity portion, also referred to as an open cavity 116, can be in fluid communication with the fluid environment E (e.g., via an aperture 120 formed through a lateral sidewall of the housing 106). The fluid environment E can apply an external pressure $P_E$ to the seal 110 that is opposed by an internal pressure $P_I$ applied to the seal 110 within the sealed cavity 114 by the incompressible fluid I.

When the internal pressure $P_I$ and the external pressure $P_E$ are different, the seal 110 can be configured to move in a manner that changes the volume of the sealed cavity 114 by an amount sufficient to equalize the internal pressure $P_I$ with the external pressure $P_E$. Differences in the internal pressure $P_I$ and the external pressure $P_E$ can arise due moving the pressure compensated sensing system 102 from one operating environment to another (e.g., from a surface location to a subsea location) and/or due to changes in fluid volumes arising from temperature variations. Because the internal pressure $P_I$ can change to match the external pressure $P_E$, the housing 106 does not need to be designed to withstand the external pressure $P_E$. Various techniques can be used to allow the seal 110 to move in a manner that changes the volume of the sealed cavity 114.

Figure 2:
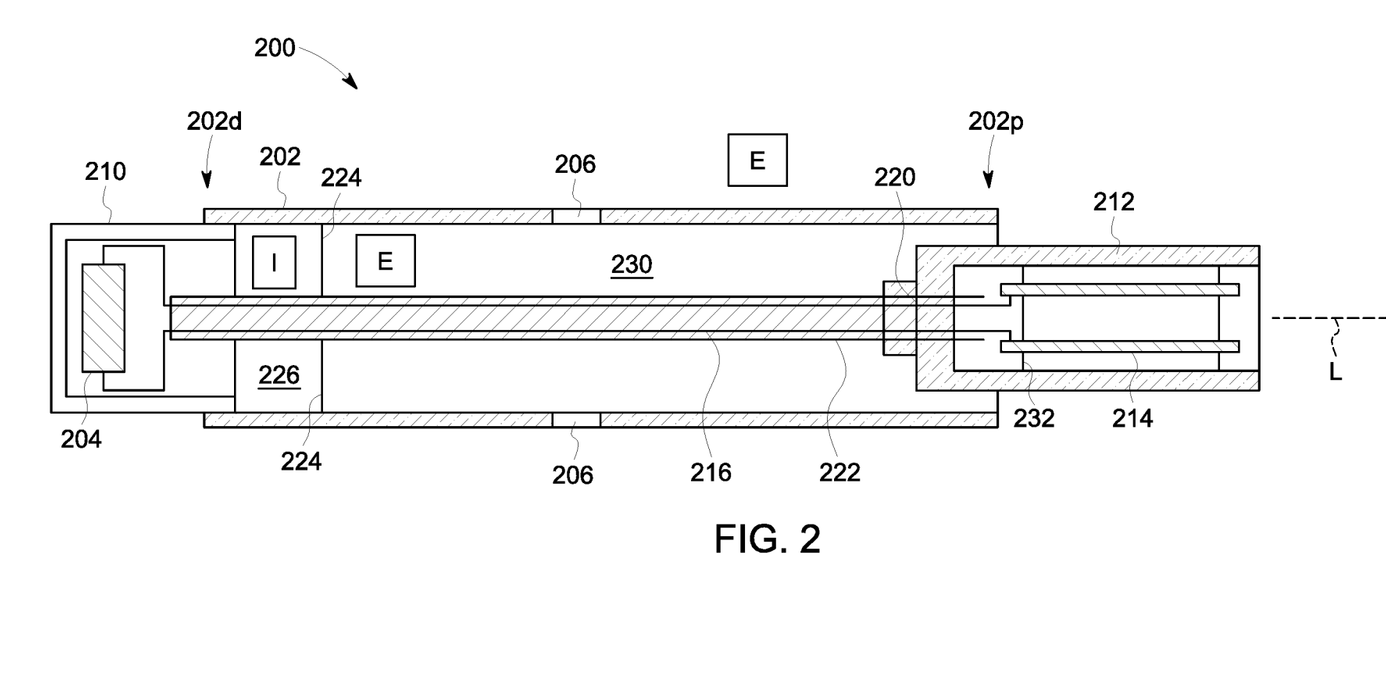
FIG. 2 is a side cross-sectional view of one exemplary embodiment of a pressure compensated sensor in the form of a proximity sensor including a diaphragm seal.

FIG. 2 illustrates one exemplary embodiment of a pressure compensated sensing system in the form of a proximity sensor 200 that can be used in the operating environment 100 of FIG. 1. As shown, the proximity sensor 200 includes a housing 202 having one or more proximity sensing elements 204 disposed therein. The housing 202 can have a length extending along a longitudinal axis L between a distal end 202d and a proximal end 202p. The housing 202 can also include one or more apertures 206 for fluid communication with the fluid environment E.

The housing 202 can have various shapes and sizes. For example, the housing 202 can be in the form of a generally hollow tube or cylinder (e.g., a right cylinder). The housing 202 can also be formed by any process and materials suitable for use within the fluid environment E. In one embodiment, the fluid environment E can be a subsea environment and the housing can be formed from one or more materials configured to provide one or more mechanical properties (e.g., strength, toughness, wear resistance, corrosion resistance, etc.) suitable for service within a subsea environment for a predetermined time (e.g., years, decades, etc.). As an example, the housing 202 can be formed from polymers, ceramics, metals and metal alloys (e.g., steels, copper and copper alloys, aluminum and aluminum alloys, titanium and titanium alloys) superalloys (e.g., Inconel®), etc.

The proximal end 202p and distal end 202d of the housing 202 can be configured to couple to one or more fluid-tight internal couplings. For example, a cap 210 can couple to and form a fluid-tight seal with the distal end 202d of the housing 202, and an electrical connector 212 can couple to and form a fluid-tight seal with the proximal end 202p of the housing 202. The fluid-tight coupling can be formed using, for example, threaded engagements, clamps, welds, brazes, and the like.

As shown in FIG. 2, the cap 210 can have a tubular shape with a volume sufficient to receive at least a portion of the proximity sensing elements 204 therein. As an example, the cap 210 can be formed as a right cylinder having a closed distal facing surface and an open proximal facing surface approximately co-axial with the housing 202.

As discussed above, the proximity sensing elements 204 can be positioned within the cap 210. In general, the proximity sensing elements 204 can be configured to acquire one or more proximity measurements of a target (e.g., target 104 in FIG. 1). Examples of proximity measurements can include, but are not limited to, one or more of distance, displacement, vibration, and speed of the target. In certain aspects, the target can be an electrically conductive (e.g., metallic) machine component and the proximity sensing elements 204 can be eddy current (EC) sensing elements. The proximity sensing elements 204 can include a wire coil (not shown) configured to receive an alternating current and thereby generate a magnetic field. When this generated magnetic field impinges the conductive target, small currents (i.e., eddy currents) can be induced within the target. These induced eddy currents can in turn produce induced magnetic fields that oppose the magnetic field generated by the proximity sensing elements 204. The interaction between the magnetic field generated by the proximity sensing elements 204 and the opposing magnetic fields induced by the target's eddy currents is dependent upon a distance between the proximity sensing elements 204 and the target. As this distance changes, electronics (not shown) can detect a change in impedance of the proximity sensing elements 204 and output a return signal (e.g., voltage) proportional to the change in distance. The return signal can be subsequently analyzed to determine the acquired proximity measurement(s).

To facilitate acquisition of proximity measurements of the target by the proximity sensing elements 204, the cap 210 can be formed from a non-magnetic material to avoid perturbing magnetic fields generated by the proximity sensing elements 204. Examples of suitable non-magnetic materials can include, but are not limited to, ceramics, plastics, and non-magnetic metals and alloys (e.g., non-magnetic steels, non-magnetic cast irons, non-ferrous metals, copper alloys, aluminum alloys, etc.).

The proximity sensing elements 204 can receive power and output return signals via the electrical connector 212. As shown in FIG. 2, the electrical connector 212 can have a tubular shape coupled to the proximal end 202p of the housing 202. In certain embodiments, the electrical connector 212 can be in the form of a right cylinder, positioned approximately co-axial to the housing 202 and having an open proximal facing proximal surface. The electrical connector 212 can be formed from any materials suitable for operation within the fluid environment E, such as those discussed above with respect to the housing 202.

The electrical connector 212 can also include electrically conductive pins 214 mounted therein. The pins 214 can be in electrical communication with the proximity sensing elements 204 via wires 216 extending from the proximity sensing elements 204, along at least a portion of the length of the housing 202, and through an opening 220 in the distal facing surface of the electrical connector 212. The open proximal end of the electrical connector 212 can also be dimensioned to receive a mating electrical cable (not shown) for establishing electrical communication with the pins 214. In this manner, the cable can supply alternating current to the proximity sensing elements 204 and can receive return signals from the proximity sensing elements 204.

In certain embodiments, the wires 216 can also extend from the proximity sensing elements 204 to the pins 214 through a tube or solid volume (e.g., a glass feedthrough). As shown in FIG. 2, an inner tube 222 can be positioned within the housing 202 and it can extend between the distal end of the electrical connector 212 and the cap 210. A proximal end of the inner tube 222 can be coupled to the distal end of the electrical connector 212, about the opening 220, for receipt of the wires 216 therein. The distal end of the inner tube 222 can terminate within the cap 210, adjacent to the proximity sensing elements 204.

A diaphragm seal 224 can extend between the housing 202 and the inner tube 222 and it can separate the housing 202 into two portions to define a sealed cavity 226 and an open cavity 230. In one aspect, the diaphragm seal 224 can be positioned at a location within the housing 202 between the cap 210 and the electrical connector 212 and it can extend between the housing 202 and the inner tube 222 (e.g., radially or at a non-normal angle with respect to the housing 202). The diaphragm seal 224 can form a fluid-tight coupling with each of the housing 202 and the inner tube 222, hermetically sealing the sealed cavity 226 from the open cavity 230. Examples of fluid-tight couplings can include, but are not limited to, threaded engagements, clamps, welds, brazes, and the like. So positioned, the sealed cavity 226 can enclose a first volume bounded by the cap 210, a distal facing surface of the diaphragm seal 224, and the housing 202. The sealed cavity 226 can also include a second volume bounded by an inner surface of the inner tube 222. The open cavity 230 can include a third volume bounded by a proximal facing surface of the diaphragm seal 224, the housing 202, an outer surface of at least a portion of the inner tube 222, and the electrical connector 212.

The configuration of the diaphragm seal 224 can vary. In one aspect, the diaphragm seal 224 can be in the form of a substantially planar plate or disc having a through hole dimensioned to accommodate the inner tube 222. In certain embodiments, the diaphragm seal 224 may not be completely planar and can include minor variations in the surface thereof.

As discussed in greater detail below, the diaphragm seal 224 can be configured to elastically deform or flex in response to an applied pressure. The diaphragm seal 224 can be formed from one or more materials capable of undergoing elastic deformation (e.g., reversible deformation) under anticipated service pressures. Suitable materials can include, but are not limited to, metals and metal alloys (e.g., steel, brass, aluminum, titanium) and polymers (e.g., polyethylene, polytetrafluoroethylene (PTFE), polyetheretherketone (PEEK)).

An incompressible fluid I can be provided within the sealed cavity 226 along with the proximity sensing elements 204. In one aspect, the incompressible fluid I can substantially fill an entire free volume of the sealed cavity 226. That is, the proximity sensing elements 204 can be immersed within the incompressible fluid I (e.g., completely immersed) and the sealed cavity 226 can be substantially free of any voids. In another aspect, the incompressible fluid I can be a dielectric fluid. Examples of the incompressible fluid I can include, but are not limited to, gels, silicone oil, mineral oil, monoethylene glycol, and the like.

In certain embodiments, the sealed cavity 226 can include a distal portion of the electrical connector 212 including the wires 216. Accordingly, the electrical connector 212 can also include a fluid-tight connector seal 232 for further containment of the incompressible fluid I.

Beneficially, immersing electrical components of the proximity sensor 200 (e.g., proximity sensing elements 204, wires 216, etc.) in the dielectric incompressible fluid I can protect electrical connections within the proximity sensor 200 and stabilize electrical parameters of the proximity sensing elements 204 (e.g., resistor-inductor-capacitor or RLC circuits), promoting long-term reliability and accuracy of the proximity sensor 200.

Figure 3A:
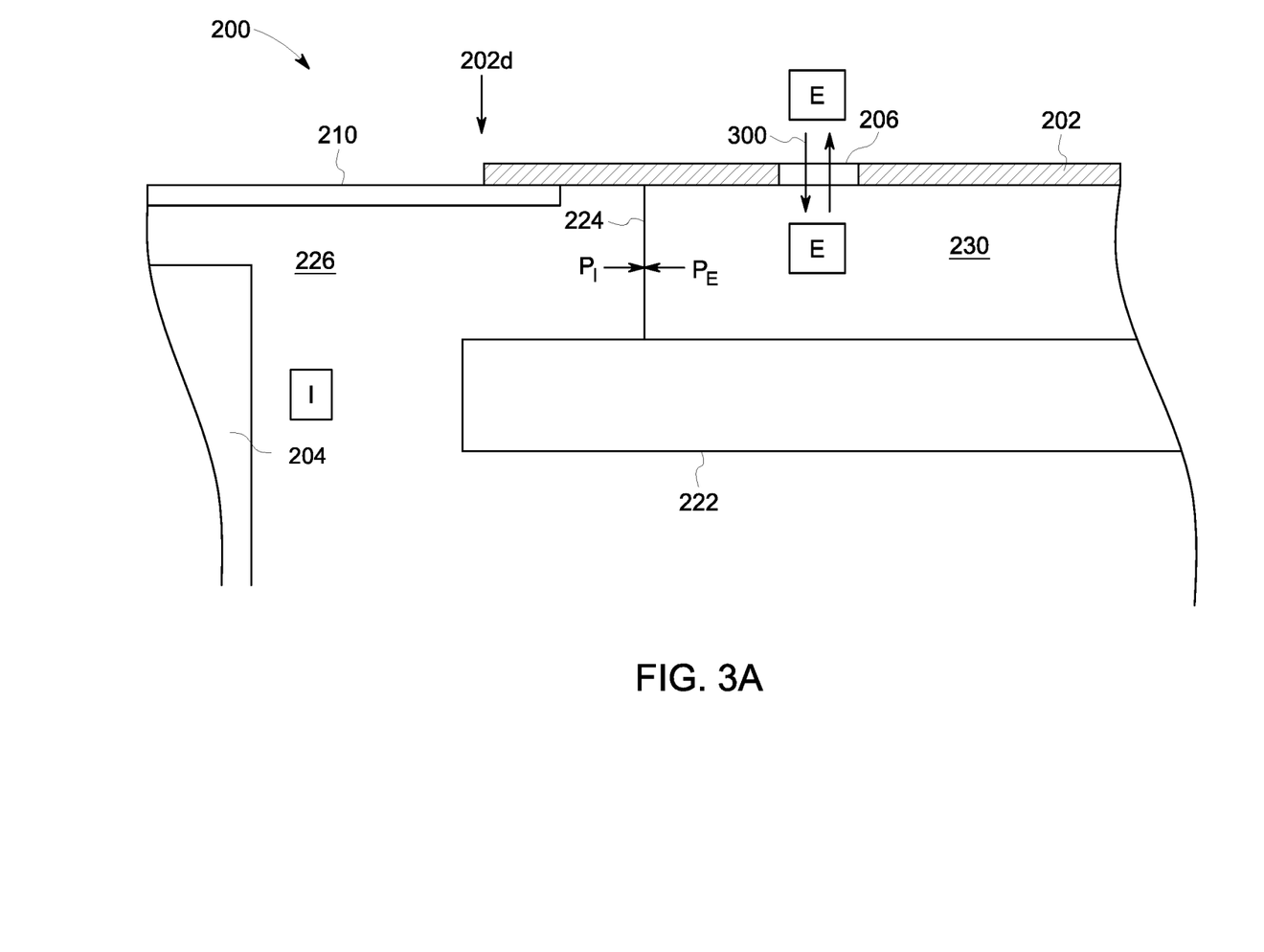
FIG. 3A is an enlarged side view illustrating the diaphragm seal of FIG. 2 in a neutral position.
Figure 3B:
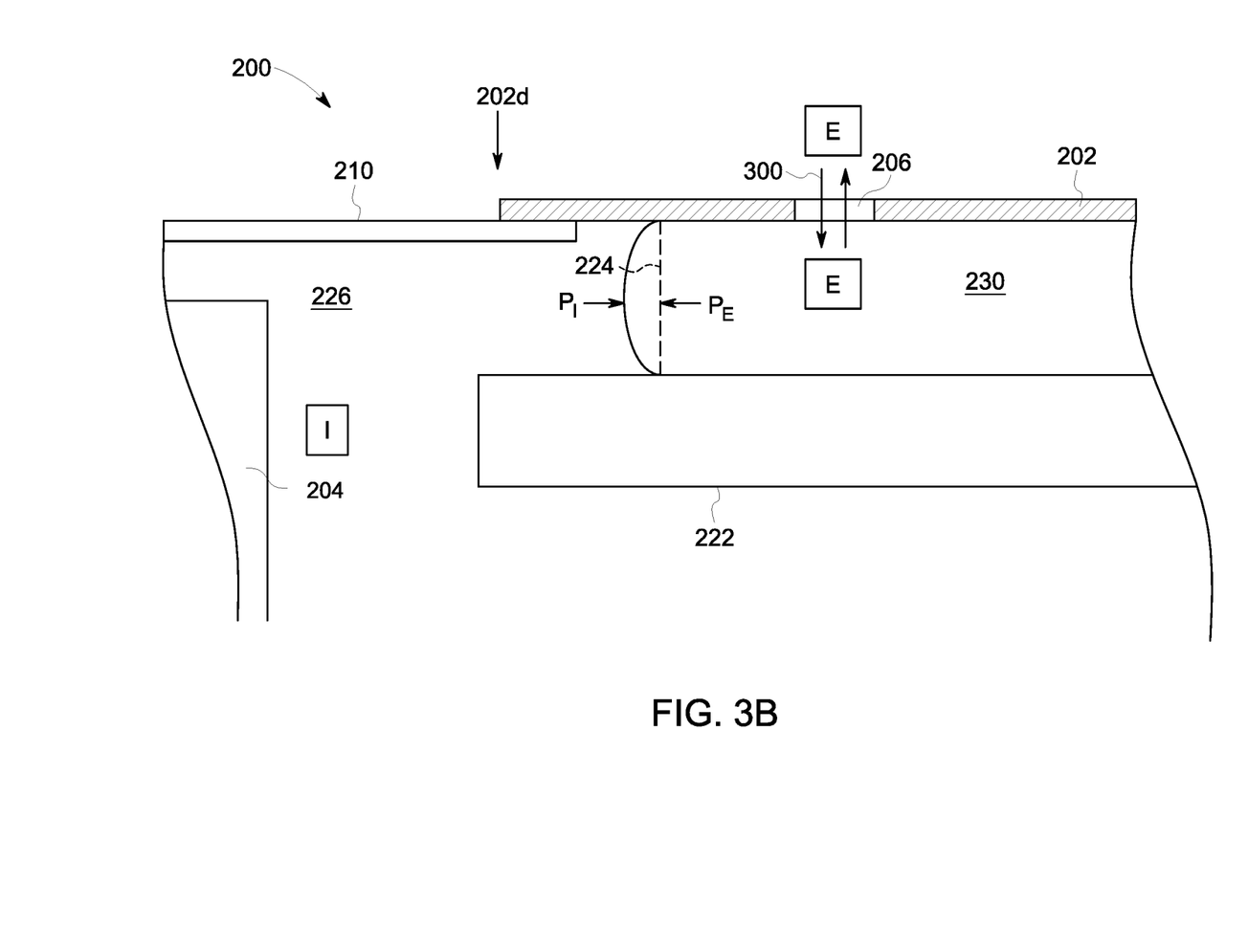
FIG. 3B is an enlarged side view illustrating the diaphragm seal of FIG. 2 in a first deflected position.
Figure 3C:
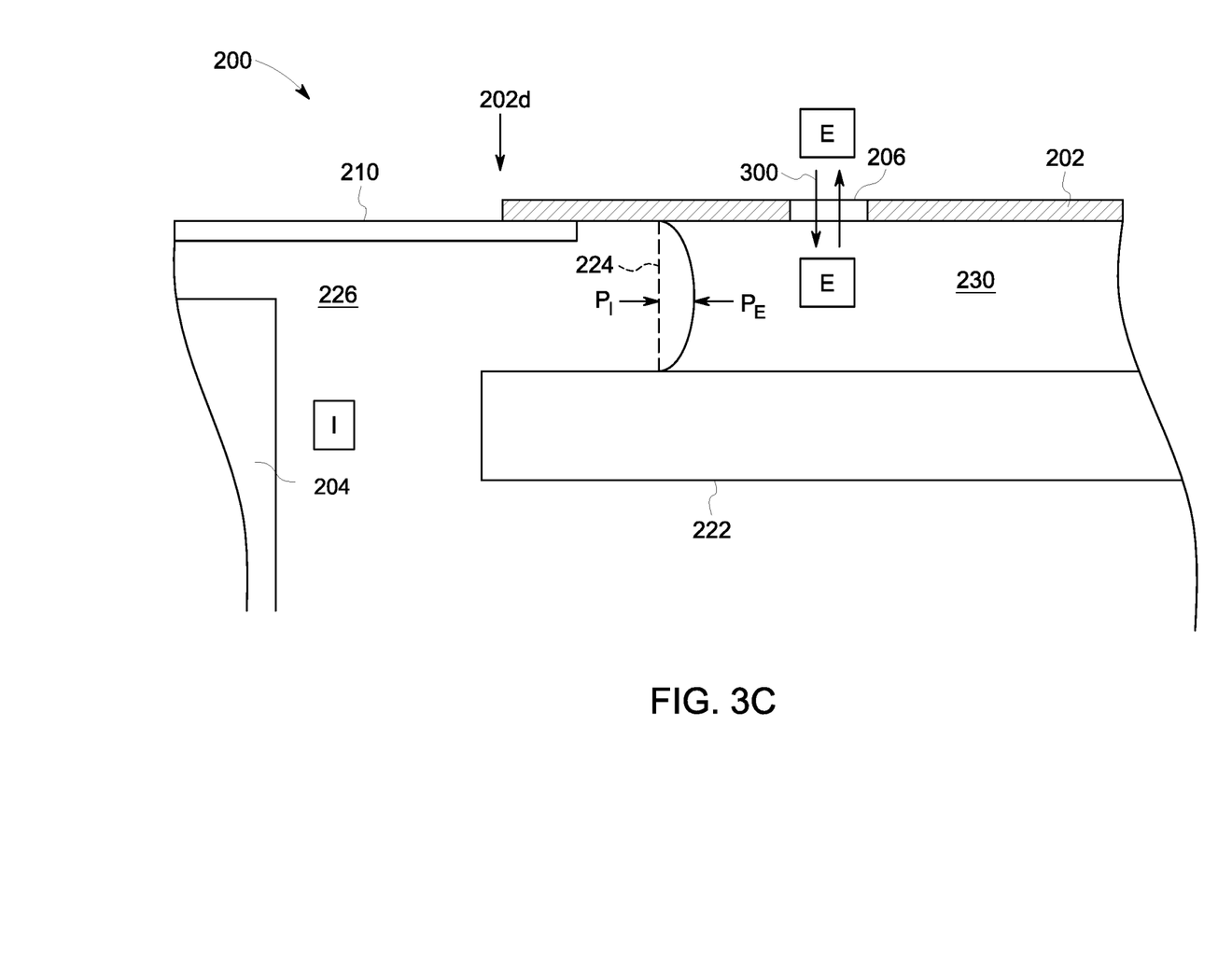
FIG. 3C is an enlarged side view illustrating the diaphragm seal of FIG. 2 in a second deflected position.

FIGS. 3A-3C present enlarged side cross-sectional views of the distal end 202d of the housing 202, illustrating use of the diaphragm seal 224 to equalize pressure within the sealed cavity 226. As shown in FIG. 3A, fluids contained within the fluid environment E can surround the proximity sensor 200 and flow freely into or out of the open cavity 230 through the aperture(s) 206, as indicated by arrow 300. As a result, the fluid environment E can exert an external pressure $P_E$ on a proximal facing surface of the diaphragm seal 224. As also shown in FIG. 3A, the incompressible fluid I and the proximity sensing elements 204 can be present within the sealed cavity 226. Accordingly, the incompressible fluid I can apply an internal pressure $P_I$ to a distal facing surface of the diaphragm seal 224, opposing the external pressure $P_E$.

When there is a difference between a magnitude of the internal pressure $P_I$ and the magnitude of the external pressure $P_E$, the diaphragm seal 224 can be configured to undergo movement in order to equalize the internal pressure $P_I$ with the external pressure $P_E$. In general, this movement can take the form of elastic deformation (e.g., bowing or deflecting) from a first position to a second position towards the one of the sealed cavity 226 or the open cavity 230 that is at a lower pressure.

As an example, when the internal pressure $P_I$ and the external pressure $P_E$ are equal, there is no net pressure upon the diaphragm seal 224 and the diaphragm seal 224 can remain stationary and approximately planar, as shown in FIG. 3A.

As shown in FIG. 3B, when the external pressure $P_E$ becomes greater than the internal pressure $P_I$, the diaphragm seal 224 can deflect from a first position (e.g., an unstressed position represented by the dashed line) to a second position towards the lower pressure cavity (e.g., towards the sealed cavity 226). In one aspect, this circumstance can occur when the proximity sensor 200 is moved from a location having a relatively low external pressure $P_E$ (e.g., a surface location) to a location having a relatively high external pressure $P_E$ (e.g., a subsea location where the external pressure $P_E$ increases significantly due to the weight of water above the subsea location). In another aspect, this circumstance can occur due to a decrease in volume of the incompressible fluid I, which can arise from a decrease in temperature. Deflection of the diaphragm seal 224 towards the sealed cavity 226 can decrease the volume of the sealed cavity 226 and, owing to the incompressibility of the incompressible fluid I, raise the internal pressure $P_I$. The deflection of the diaphragm seal 224 can continue until the internal pressure $P_I$ equals the external pressure $P_E$.

In contrast, when the external pressure $P_E$ is less than the internal pressure $P_I$, the diaphragm seal 224 can deflect towards the open cavity 230, as shown in FIG. 3C. In one aspect, this circumstance can occur when the proximity sensor 200 is moved from a location having a relatively high external pressure $P_E$ (e.g., a subsea location) to a location having a relatively lower external pressure $P_E$ (e.g., a shallower subsea location or the surface). In another aspect, this circumstance can occur due to an increase in volume of the incompressible fluid I which can arise from an increase in temperature. Deflection of the diaphragm seal 224 away from the sealed cavity 226 can increase the volume of the sealed cavity 226 and, owing to the incompressibility of the incompressible fluid I, decrease the internal pressure $P_I$. The deflection of the diaphragm seal 224 can continue until the internal pressure $P_I$ decreases to equal the external pressure $P_E$.

In certain embodiments, the internal pressure $P_I$ prior to deployment of the proximity sensor 200 (e.g., before submerging within a subsea environment) can be approximately equal to the external pressure $P_E$ (e.g., atmospheric pressure). As a result, the position of the diaphragm seal 224 prior to deployment can be approximately flat, as illustrated in FIG. 3A. In other embodiments, the internal pressure $P_I$ prior to deployment of the proximity sensor 200 can be different than the external pressure $P_E$ (e.g., atmospheric pressure). When the external pressure $P_E$ is greater than the internal pressure $P_I$, the position of the diaphragm seal 224 prior to deployment can be deflected towards the sealed cavity 226, as illustrated in FIG. 3B. Alternatively, when the external pressure $P_E$ is less than the internal pressure $P_I$, the position of the diaphragm seal 224 prior to deployment can be deflected towards the open cavity 230, as illustrated in FIG. 3C.

Figure 4:
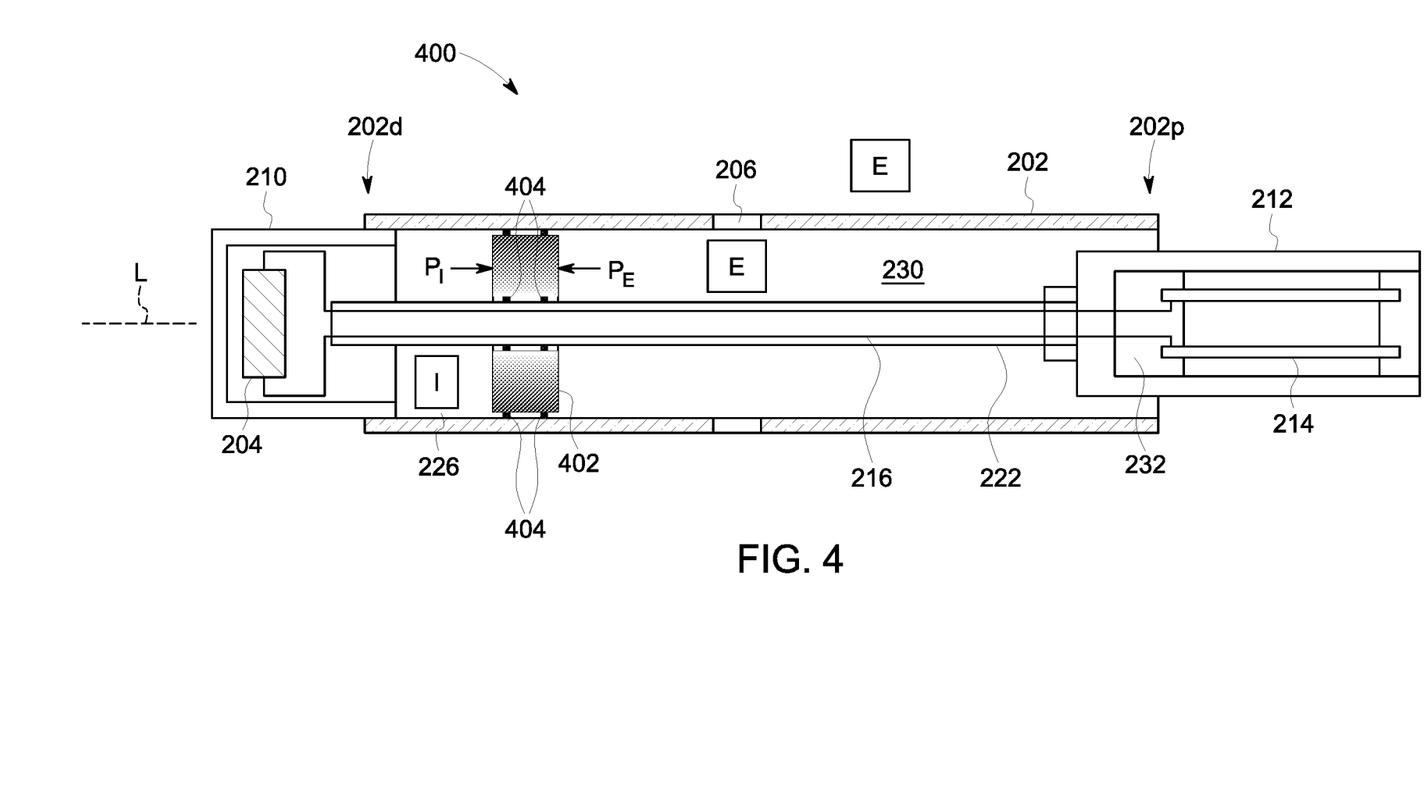
FIG. 4 is a side cross-sectional view of another exemplary embodiment of a pressure compensated sensor in the form of a proximity sensor including a piston seal.

FIG. 4 is a side cross-sectional view of another exemplary embodiment of a pressure compensated sensor in the form of a proximity sensor 400. The proximity sensor 400 of FIG. 4 replaces the diaphragm seal 224 of the proximity sensor 200 of FIG. 2 with a piston seal 402 but is otherwise unchanged, with like numerals representing like components, unless indicated otherwise. As discussed below, the piston seal 402 can be configured to adjust the internal pressure $P_I$ of the sealed cavity 226 in response to changes in the external pressure $P_E$ to provide approximately zero net pressure on the sealed cavity 226.

As shown in FIG. 4, the piston seal 402 can extend between the housing 202 and the inner tube 222 (e.g., radially or at a non-normal angle with respect to the housing 202) to separate the housing 202 into two portions, thereby defining the sealed cavity 226 and the open cavity 230. One or more gaskets 404 can be interposed between the piston seal 402, the housing 202 and the inner tube 222 to provide a fluid-tight coupling, allowing the piston seal 402 to hermetically seal the sealed cavity 226 from the open cavity 230. The external pressure $P_E$ of the fluid environment E can be applied to a proximal facing surface of the piston seal 402 and the internal pressure $P_I$ of the incompressible fluid I can be applied to a distal facing surface of the piston seal 402. When the internal pressure $P_I$ and the external pressure $P_E$ are equal, as shown in FIG. 4, there is no net pressure upon the piston seal 402 and the piston seal 402 can maintain a stationary position.

However, when the external pressure $P_E$ differs from the internal pressure $P_I$, the piston seal 402 can translate longitudinally. When the external pressure $P_E$ is greater than the internal pressure $P_I$, the piston seal 402 can translate distally towards the sealed cavity 226, thereby decreasing the volume of the sealed cavity 226 and increasing the internal pressure $P_I$. In contrast, when the external pressure $P_E$ is less than the internal pressure $P_I$, the piston seal 402 can translate proximally towards the sealed cavity 226, thereby increasing the volume of the sealed cavity 226 and decreasing the internal pressure $P_I$. In either case, the longitudinal translation of the piston seal 402 can continue until the internal pressure $P_I$ equals the external pressure $P_E$, at which point the longitudinal translation can cease.

Figure 5:
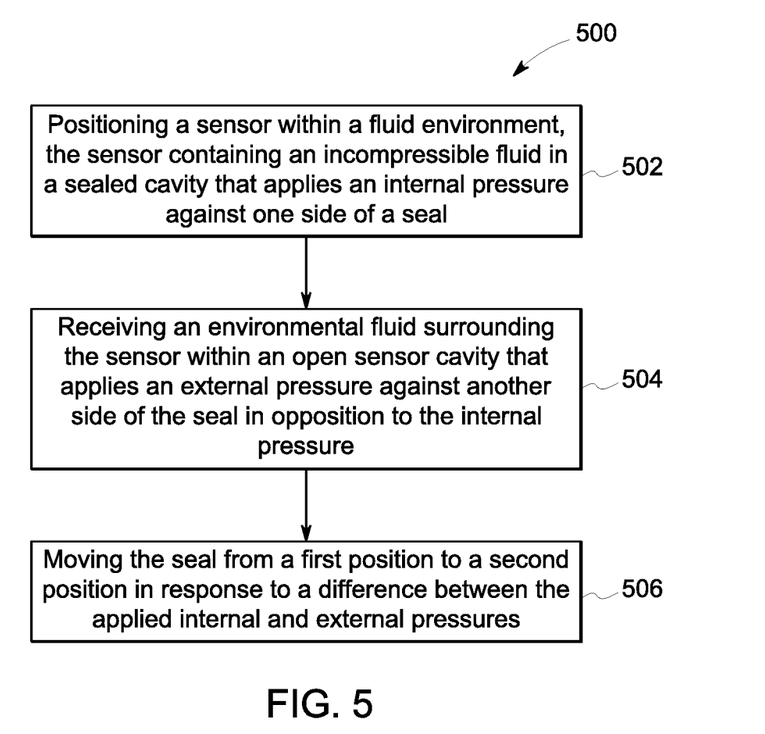
FIG. 5 is a flow diagram illustrating an exemplary embodiment of a method for equalizing pressure of a sensor with a fluid environment.

FIG. 5 is a flow diagram illustrating an exemplary embodiment of a method 500 for equalizing pressure within a sensor including operations 502-506. The method 500 is described below in connection with the pressure compensated sensing system 102 of FIG. 1. However, the method 500 is not limited to use with the pressure compensated sensing system 102 and can be used with any sensing system. In certain aspects, embodiments of the method 500 can include greater or fewer operations than illustrated in FIG. 5 and can be performed in a different order than illustrated in FIG. 5.

As shown in FIG. 5, in operation 502, the sensor (e.g., the pressure compensated sensing system 102 of FIG. 1) can be positioned within the fluid environment E. As discussed above, the pressure compensated sensing system 102 can include the sealed cavity 114 containing the incompressible fluid I and at least one sensing element 112, where the incompressible fluid I applies the internal pressure $P_I$ against one side of the seal 110 (e.g., a distal facing side of the seal 110). In one aspect, the incompressible fluid I can substantially fill all void space within the sealed cavity 114. In another aspect, the sealed cavity 114 can be substantially free of compressible materials.

In operation 504, an environmental fluid E surrounding the pressure compensated sensing system 102 can fill the open cavity 116 and exert the environmental pressure $P_E$ against a side of the seal 110 opposite the internal pressure $P_I$ (e.g., a proximal facing side of the seal 110). In certain aspects, the seal 110 can be in the form of a diaphragm (e.g., the diaphragm seal 224 of FIG. 2) or a piston (e.g., the piston seal 402 of FIG. 4).

In operation 506, the seal 110 can move in response to a pressure difference between the internal pressure $P_I$ applied to the seal 110 by the incompressible fluid I and the external pressure $P_E$ applied to the seal 110 by the environmental fluid E. As discussed above, in embodiments where the seal 110 is in the form of a diaphragm seal, such as diaphragm seal 224 of FIG. 2, movement of the seal 110 from a first position to a second position can be an elastic displacement. Alternatively, in embodiments where the seal 110 is in the form of a piston seal, such as piston seal 402 of FIG. 4, movement of the seal 110 from a first position to a second position can be in the form of translation along a longitudinal axis of the housing 106.

Exemplary technical effects of the methods, systems, and devices described herein include, by way of non-limiting example, pressure compensation of sensors deployed in subsea environments.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

What is claimed is:

1. A pressure compensated sensor system, comprising:
   a housing extending along a longitudinal axis between a proximal end and a distal end and defining a cavity therein;
   an inner tube positioned within the housing and extending in the direction of the longitudinal axis;
   a seal positioned within the cavity and extending laterally with respect to the longitudinal axis between the housing and the inner tube, the seal dividing the cavity into a first fluidly sealed cavity portion and a second cavity portion configured for exposure to a fluid environment surrounding the housing;
   a cap directly secured to the distal end of the housing, wherein the first cavity portion includes a cap volume defined by the cap;
   one or more sensing elements positioned within the cap volume; and
   an incompressible fluid disposed within the first cavity portion;
   wherein the seal is configured to move in response to pressure differences between the first cavity portion and the second cavity portion.

2. The system of claim 1, wherein the housing includes an aperture in a sidewall configured to allow fluid to flow from the fluid environment into the second cavity portion.

3. The system of claim 1, wherein the seal comprises a diaphragm seal configured to elastically deform in response to pressure differences between the first cavity and the second cavity.

4. The system of claim 1, wherein the incompressible fluid substantially fills the first cavity portion, and the sensing elements are submerged in the incompressible fluid.

5. The system of claim 1, wherein the incompressible fluid comprises a dielectric.

6. The system of claim 1, wherein the sensing elements include a proximity sensor configured to induce an eddy current in a target.

7. The system of claim 1, wherein the fluid environment is a subsea environment.

* * * * *